US009515899B2

(12) United States Patent
Vemuri et al.

(10) Patent No.: US 9,515,899 B2
(45) Date of Patent: Dec. 6, 2016

(54) PROVIDING OPTIMIZED QUALITY OF SERVICE TO PRIORITIZED VIRTUAL MACHINES AND APPLICATIONS BASED ON QUALITY OF SHARED RESOURCES

(71) Applicant: Veritas Technologies LLC, Mountain View, CA (US)

(72) Inventors: Hari Krishna Vemuri, Pune (IN); Shweta Goyal, Pune (IN); Nirendra Awasthi, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 191 days.

(21) Appl. No.: 13/720,566

(22) Filed: Dec. 19, 2012

(65) Prior Publication Data
US 2014/0173113 A1 Jun. 19, 2014

(51) Int. Cl.
*H04L 12/24* (2006.01)
*H04L 29/08* (2006.01)
*G06F 9/455* (2006.01)

(52) U.S. Cl.
CPC ....... *H04L 41/5022* (2013.01); *G06F 9/45558* (2013.01); *H04L 67/1097* (2013.01); *H04L 67/322* (2013.01); *G06F 2009/45579* (2013.01)

(58) Field of Classification Search
USPC ....... 709/226, 224, 223, 225, 229, 201, 203, 709/217, 219, 221, 202, 5, 206, 228, 230, 709/236, 238, 248; 718/104, 103, 100, 102, 718/1, 105; 370/329, 401, 230, 235, 231, 370/232, 252; 707/999.01, E17.007, 707/999.001, 748, 754, 999.008, 999.009, 707/999.104
See application file for complete search history.

(56) References Cited

U.S. PATENT DOCUMENTS

| 6,101,180 | A | 8/2000 | Donahue et al. | |
|---|---|---|---|---|
| 7,051,098 | B2 * | 5/2006 | Masters et al. | 709/224 |
| 7,096,248 | B2 * | 8/2006 | Masters et al. | 709/201 |
| 7,171,654 | B2 * | 1/2007 | Werme et al. | 717/130 |
| 7,181,743 | B2 * | 2/2007 | Werme et al. | 718/104 |

(Continued)

FOREIGN PATENT DOCUMENTS

WO    WO 2004/107196 A1    12/2004

OTHER PUBLICATIONS

PCT International Search Report and Written Opinion for Counterpart Application PCT/US13/56967 dated Jan. 7, 2014, 24 pages.

(Continued)

*Primary Examiner* — Saket K Daftuar
(74) *Attorney, Agent, or Firm* — Campbell Stephenson LLP (57) ABSTRACT

Quality of service is provided to prioritized VMs and applications, based on the varied quality of different shared computing resources. Each VM or application has an associated priority. A quality rating is dynamically assigned to each shared computing resource. Requests for shared computing resources made by specific VMs or applications are received. For each specific received request, the current priority of the requesting VM or application is identified. In response to each received request, a specific shared computing resource is assigned to the specific requesting VM or application. This assignment is made based on the current priority of the requesting VM or application and the current quality rating of the shared computing resource, thereby providing quality of service to the requesting VM or application corresponding to its current priority.

21 Claims, 6 Drawing Sheets

(56) References Cited

U.S. PATENT DOCUMENTS

| | | | |
|---|---|---|---|
| 7,552,438 B1* | 6/2009 | Werme et al. | 718/104 |
| 7,636,781 B2* | 12/2009 | Li et al. | 709/226 |
| 7,711,822 B1* | 5/2010 | Duvur et al. | 709/226 |
| 7,961,608 B2* | 6/2011 | Couturier | 370/230 |
| 8,321,558 B1* | 11/2012 | Sirota et al. | 709/224 |
| 8,321,569 B2* | 11/2012 | Bello et al. | 709/226 |
| 8,347,302 B1* | 1/2013 | Vincent et al. | 718/104 |
| 8,584,128 B1* | 11/2013 | Don et al. | 718/103 |
| 8,676,976 B2* | 3/2014 | Heller, Jr. | 709/226 |
| 2001/0033646 A1* | 10/2001 | Porter et al. | 379/243 |
| 2002/0115443 A1* | 8/2002 | Freiberg et al. | 455/450 |
| 2003/0058804 A1 | 3/2003 | Saleh et al. | |
| 2003/0167270 A1* | 9/2003 | Werme et al. | 707/10 |
| 2003/0177218 A1 | 9/2003 | Poirot et al. | |
| 2003/0191829 A1* | 10/2003 | Masters et al. | 709/223 |
| 2003/0217152 A1* | 11/2003 | Kasper, II | 709/226 |
| 2004/0205414 A1 | 10/2004 | Roselli et al. | |
| 2005/0055322 A1* | 3/2005 | Masters et al. | 707/1 |
| 2005/0055350 A1* | 3/2005 | Werme et al. | 707/10 |
| 2005/0083834 A1 | 4/2005 | Dunagan et al. | |
| 2006/0182119 A1* | 8/2006 | Li et al. | 370/395.52 |
| 2007/0132770 A1* | 6/2007 | Stefanidis et al. | 345/541 |
| 2007/0169126 A1* | 7/2007 | Todoroki et al. | 718/103 |
| 2008/0162735 A1* | 7/2008 | Voigt et al. | 710/6 |
| 2009/0138752 A1 | 5/2009 | Graham et al. | |
| 2009/0172315 A1* | 7/2009 | Iyer et al. | 711/158 |
| 2009/0288090 A1* | 11/2009 | Ujibashi et al. | 718/103 |
| 2010/0214996 A1* | 8/2010 | Santhanam et al. | 370/329 |
| 2010/0262973 A1* | 10/2010 | Ernst et al. | 718/104 |
| 2011/0153825 A1* | 6/2011 | Bello et al. | 709/226 |
| 2011/0158254 A1* | 6/2011 | Basso et al. | 370/468 |
| 2011/0219263 A1 | 9/2011 | Goel | |
| 2012/0054768 A1* | 3/2012 | Kanna et al. | 718/104 |
| 2012/0124591 A1* | 5/2012 | Cadambi et al. | 718/103 |
| 2012/0159090 A1* | 6/2012 | Andrews et al. | 711/153 |
| 2013/0007755 A1* | 1/2013 | Chambliss et al. | 718/103 |
| 2013/0227562 A1* | 8/2013 | Tsirkin et al. | 718/1 |
| 2014/0006620 A1* | 1/2014 | Assuncao et al. | 709/226 |
| 2014/0068607 A1* | 3/2014 | Tsirkin et al. | 718/1 |
| 2014/0096135 A1* | 4/2014 | Kundu et al. | 718/1 |
| 2014/0156705 A1* | 6/2014 | Beecham et al. | 707/783 |
| 2014/0173614 A1* | 6/2014 | Konik et al. | 718/104 |

OTHER PUBLICATIONS

Oliver Nieharster et al., "Cost-Aware and SLO-Fulfilling Software as a Service", Journal of Grid Computing, Kluwer Academic Publishers, DO, vol. 10, No. 3, Sep. 1, 2012, pp. 553-577.

* cited by examiner

PROVIDING OPTIMIZED QUALITY OF SERVICE TO PRIORITIZED VIRTUAL MACHINES AND APPLICATIONS BASED ON QUALITY OF SHARED RESOURCES

TECHNICAL FIELD

This disclosure pertains generally to computing device virtualization, and more specifically to providing optimized quality of service to prioritized virtual machines and applications based on the varying quality of shared computing resources.

BACKGROUND

Clusters are groups of computers that use groups of redundant computing resources in order to provide continued service when individual system components fail. More specifically, clusters eliminate single points of failure by providing multiple servers, multiple network connections, redundant data storage, etc. Clustering systems are often combined with storage management products that provide additional useful features, such as journaling file systems, logical volume management, multipath input/output (I/O) functionality, etc. For example, some storage management products such as Veritas Volume Manager and Dynamic Multipathing support multipathed storage devices, in which a virtual disk device is made available to initiators of I/O, wherein multiple physical paths exist between the virtual disk and the underlying physical storage.

In a high-availability clustering system, the failure of a server (or of a specific computing resource used thereby such as a network adapter, storage device, etc.) is detected, and the application that was being run on the failed server is automatically restarted on another computing system. This process is called "failover." The high availability clustering system can also detect the failure of the application itself, and failover the application to another node. In effect, the high availability clustering system monitors applications, the servers the applications run on, and the resources used by the applications, to ensure that the applications remain highly available. Clusters can be used to provide applications to customers according to service level agreements guaranteeing varying levels of availability.

Virtualization of computing devices can be employed in high availability clustering and in other contexts. One or more virtual machines (VMs or guests) can be instantiated at a software level on physical computers (host computers or hosts), such that each VM runs its own operating system instance. Just as software applications, including server applications such as databases, enterprise management solutions and e-commerce websites, can be run on physical computers, so too can these applications be run on virtual machines. A high availability cluster of VMs can be built, in which the applications being monitored by the high availability clustering system run on and are failed over between VMs, as opposed to physical servers.

In some virtualization scenarios, a software component often called a hypervisor can act as an interface between the guests and the host operating system for some or all of the functions of the guests. In other virtualization implementations, there is no underlying host operating system running on the physical, host computer. In those situations, the hypervisor acts as an interface between the guests and the hardware of the host computer, in effect functioning as the host operating system, on top of which the guests run. Even where a host operating system is present, the hypervisor sometimes interfaces directly with the hardware for certain services. In some virtualization scenarios, the host itself is in the form of a guest (i.e., a virtual host) running on another host.

A hypervisor receives requests for resources from VMs, and allocates shared resources such as CPU, memory, I/O bandwidth, I/O channels, storage, performance boosting cache, replication links, etc. In a storage management environment, multipathed storage can also be shared between VMs or hosts. Although conventional hypervisors can allocate different shares of the resources to different VMs, conventional hypervisors treat all available resources of a given type (e.g., CPU, memory and I/O channels) as being similar and operating in essentially the same way. This limits the extent to which varying quality of service can be provided to different VMs and applications based on their priority or the underlying service level agreements with customers.

It would be desirable to address this issue.

SUMMARY

Quality of service is provided to prioritized VMs or other applications on a computer, based on the varied quality of different shared computing resources. Each VM or application has a priority, which can indicate the quality of service it is to be provided with relative to other VMs or applications. Shared computing resources are accessible by multiple VMs or applications. Shared computing resources can be shared among multiple VMs or applications running on a single computer, for example to facilitate virtualization. A quality rating is assigned to each shared computing resource. In some embodiments, a quality rating comprises a single quantification of the overall quality of a specific shared computing resource. Assigned quality ratings can also quantify a plurality of qualitative factors concerning specific types of shared computing resources, or specific instances of shared computing resources. Shared computing resources can be periodically evaluated in order to determine current quality ratings based on their current status. The current quality ratings are then assigned to the shared computing resources.

Requests for shared computing resources made by specific VMs or applications are received. For example, the received requests can be in the form of requests for shared computing resources made by specific VMs to a hypervisor, for example to access a virtual disk. For each specific received request, the priority of the requesting application is identified. Identifying the priority of a requesting application can further comprise identifying the specific application that made the request for shared computing resources, for example from a tag in the request itself. Where the received request is in the form of an IO operation, the shared computing resource can be identified by the targeted LUN. In response to each received request, a specific shared computing resource is assigned to the specific requesting application. This assignment is made based on the priority of the requesting application and the quality rating of the shared computing resource, thereby providing quality of service to the requesting application corresponding to its priority. In some embodiments, information documenting usage of shared computing resources by applications over time is logged for future reference.

In one embodiment, received requests for shared computing resources comprise requests made by specific applications to initiate IO operations targeting a specific storage device. In this case, the shared computing resources are in the form of a plurality of queues for accessing the specific storage device. Each queue is configured to access the specific storage device with a different level of priority. In this embodiment, requesting applications are assigned a specific one of the queues for processing the IO operation.

In another embodiment, received requests for shared computing resources are in the form of requests made by specific applications to a multipathing component, in order to access a multipathed storage device. In this embodiment, the shared computing resources can comprise a plurality of queues for accessing a specific one of multiples paths to physical storage, wherein assigning quality ratings further comprises assigning a specific level of priority to each queue. The shared computing resources can instead further comprise the plurality of paths to physical storage, in which case a quality rating is assigned to a specific path as a quantification of its quality.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
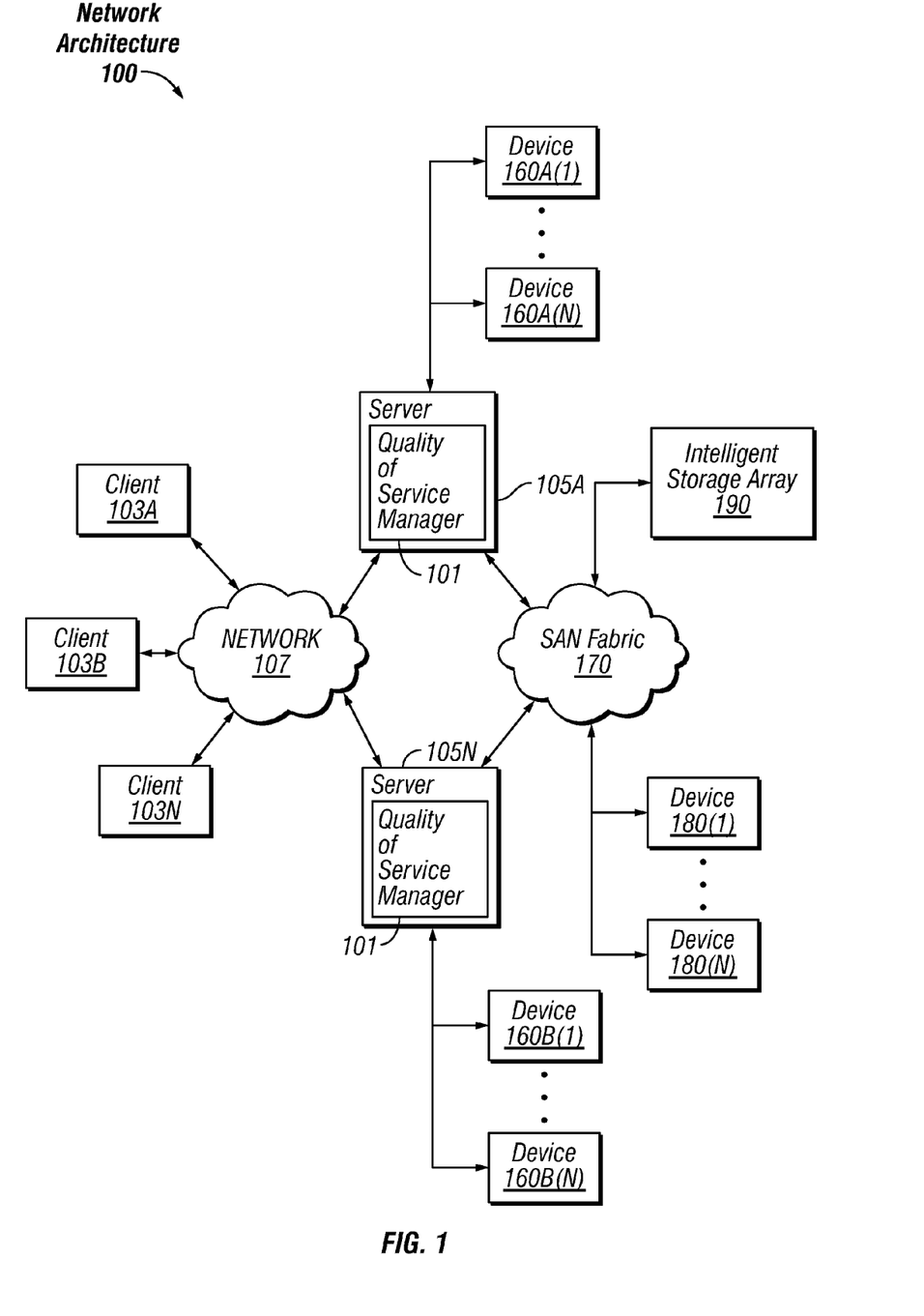
FIG. 1 is a block diagram of an exemplary network architecture in which a quality of service manager can be implemented, according to some embodiments.

FIG. 1 is a block diagram illustrating an exemplary network architecture 100 in which a quality of service manager 101 can be implemented. In the illustrated network architecture 100, client systems 103A, 103B and 103N, as well as servers 105A and 105N, are communicatively coupled to a network 107. A quality of service manager 101 is illustrated as residing on servers 105A and 105N, but in other embodiments the quality of service manager 101 can reside on more, fewer or different computers 210 as desired. In FIG. 1, server 105A is further depicted as having storage devices 160A(1)-(N) directly attached, and server 105N is depicted with storage devices 160B(1)-(N) directly attached. Servers 105A and 105N are also connected to a SAN fabric 170 which supports access to storage devices 180(1)-(N) by servers 105A and 105N, and so by client systems 103A-N via network 107. Intelligent storage array 190 is also shown as an example of a specific storage device accessible via SAN fabric 170. In other embodiments, shared storage is implemented using FC and iSCSI (not illustrated) instead of (or in combination with) a SAN fabric 170.

Many different networking technologies can be used to provide connectivity from each of client computer systems 103A-N to network 107. Some examples include: LAN, WAN and various wireless technologies. Client systems 103A-N are able to access applications and/or data on server 105A or 105N using, for example, a web browser or other client software (not shown). This enables client systems 103A-N to run applications from an application server 105 and/or to access data hosted by a storage server 105 or one of storage devices 160A(1)-(N), 160B(1)-(N), 180(1)-(N) or intelligent storage array 190.

Although FIG. 1 illustrates three clients 103A-N and two servers 105A-N as an example, in practice many more (or fewer) computers can be deployed. In one embodiment, the network 107 is in the form of the Internet. Other networks 107 or network-based environments can be used in other embodiments.

Figure 2:
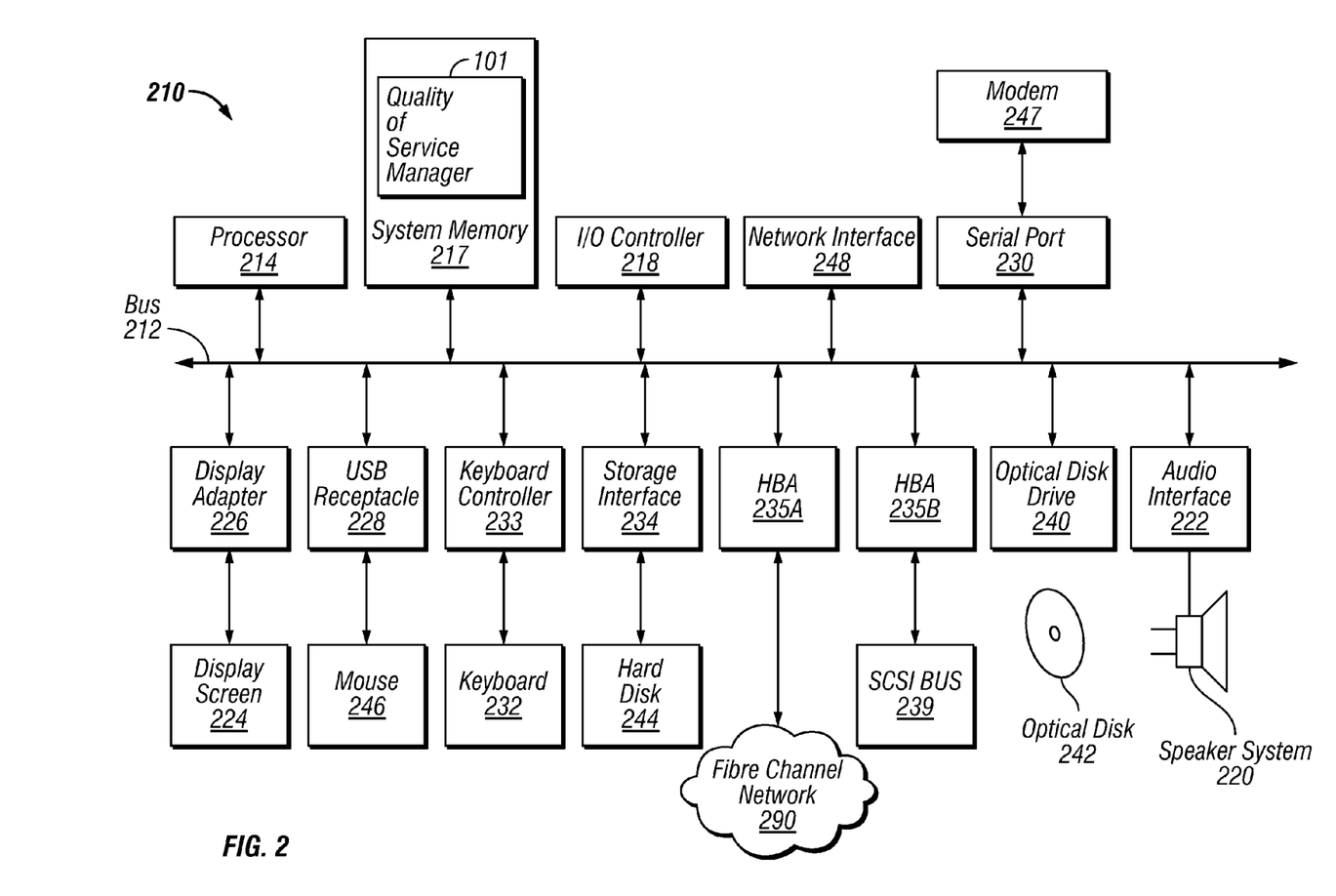
FIG. 2 is a block diagram of a computer system suitable for implementing a quality of service manager, according to some embodiments.

FIG. 2 is a block diagram of a computer system 210 suitable for implementing a quality of service manager 101. The clients 103 and servers 105 illustrated in Figure can be in the form of computers 210 such as the one illustrated in FIG. 2. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker system 220, a display adapter 226 communicatively coupled to an external video output device such as a display screen 224, one or more interfaces such as serial ports 230, Universal Serial Bus (USB) receptacles 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and a network interface 248 coupled, e.g., directly to bus 212.

Other components (not illustrated) may be connected in a similar manner (e.g., document scanners, digital cameras, printers, etc.). Conversely, all of the components illustrated in FIG. 2 need not be present. The components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the quality of service manager 101 is illustrated as residing in system memory 217. The workings of the quality of service manager 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

Figure 3:
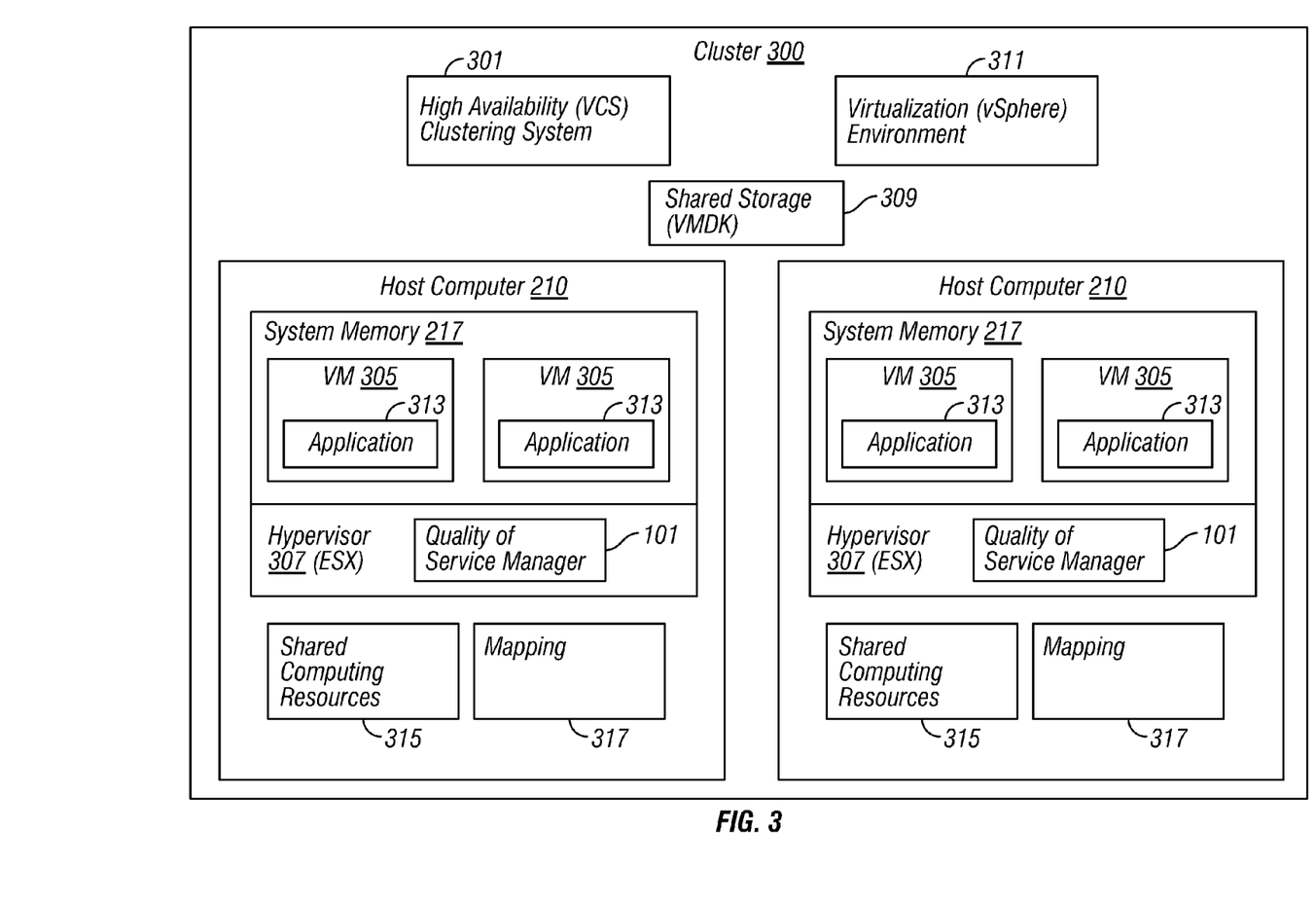
FIG. 3 is a block diagram of the operation of a quality of service manager, according to some embodiments.

FIG. 3 illustrates the operation of a quality of service manager 101, according to some embodiments. FIG. 3 illustrates an instance of a quality of service manager 101 running at a hypervisor 307 level on each one of multiple physical computers 210 of a cluster 300, wherein one or more VMs 305 run on each physical computer 210, as discussed in greater detail below. It is to be understood that in different embodiments, the functionalities of the quality of service manager 101 can reside on a server 105, client 103, or be distributed between multiple computer systems 210, including within a cloud-based computing environment in which the functionality of the quality of service manager 101 is provided as a service over a network 107. It is to be understood that although a quality of service manager 101 is illustrated in FIG. 3 as a single entity, the illustrated quality of service manager 101 represents a collection of functionalities, which can be instantiated as a single or multiple modules as desired. It is to be understood that the modules of the quality of service manager 101 can be instantiated (for example as object code or executable images) within the system memory 217 (e.g., RAM, ROM, flash memory) of any computer system 210, such that when at least one processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the quality of service manager 101 can be stored on computer-readable storage media, such that when the program code is loaded into computer memory 217 and executed by at least one processor 214 of the computer system 210, the computer system 210 executes the associated functionality. Any form of non-transitory computer readable medium can be used in this context, such as magnetic or optical storage media. As used herein, the term "computer readable medium" does not mean an electrical signal separate from an underlying physical medium.

FIG. 3 illustrates a cluster 300 instantiated in the context of a clustering and storage system 301 in conjunction with a virtualization environment 311. For efficiency of illustration and explanation, both the clustering and storage system 301 and the virtualization environment 311 are illustrated as centralized components. It is to be understood that, in practice, both the clustering and storage system 301 and the virtualization environment 311 contain components that are distributed throughout the cluster 300. FIG. 3 illustrates a cluster 300 comprising two host computers 210, each running two VMs 305 (guests). The VMs 305 are provided by the virtualization environment 311. Although FIG. 3 depicts only two physical computers 210, it is to be understood that in different embodiments clusters 300 can contain more (or fewer) computer systems 210 as desired. Each VM 305 runs on a physical host computer 210, for example of the type illustrated in FIG. 2. One or more VMs 305 can run on each host 210 (two VMs 305 per host 210 are illustrated in FIG. 3, although one VM 305 or more than two VMs 305 can run on a single host 210). In turn, one or more applications 313 can run on each VM 305.

As illustrated in FIG. 3, a hypervisor runs on each physical host computer 210. In one embodiment, the hypervisor is in the form of a hardware level or "bare metal" hypervisor 307, and acts as the functioning operating system for the VMs 305 and any additional virtualization environment software. As used herein, the term "hardware level hypervisor" means a component that acts as an interface between at least one VM 305 and the hardware of the host computer 210 (as opposed to an operating system running on the host) for at least some services. Note that services described herein as being performed by a hypervisor 307 are, under certain virtualization scenarios, performed by a component with a different name, such as "supervisor virtual machine," "virtual machine manager (VMM)," "service partition," or "domain 0 (dom0)."

In one embodiment, the virtualization environment 311 is in the form of software provided by VMware, Inc. In this case, the hypervisor 307 is in the form of VMware's hardware level hypervisor VMware ESX 307. It is to be understood that the name of VMware's hardware level hypervisor 307 can change between product releases (for example, it used to be called ESX Server and in the future could be called something else). In a VMware based virtualization environment 311, the supporting software suite can be VMware vSphere, which is a VMware cloud enabled virtualization software package. VMware vSphere runs on top of ESX. It is to be understood that the name of VMware's cloud enabled virtualization software package can change between product releases. It is to be further understood that although VMware virtualization environments 311 are discussed herein, other embodiments can be implemented in the context of other virtualization environments 311 that provide similar functionality and features. For example, in other embodiments virtualization environments such as Microsoft's Hyper-V are used.

Figure 4:
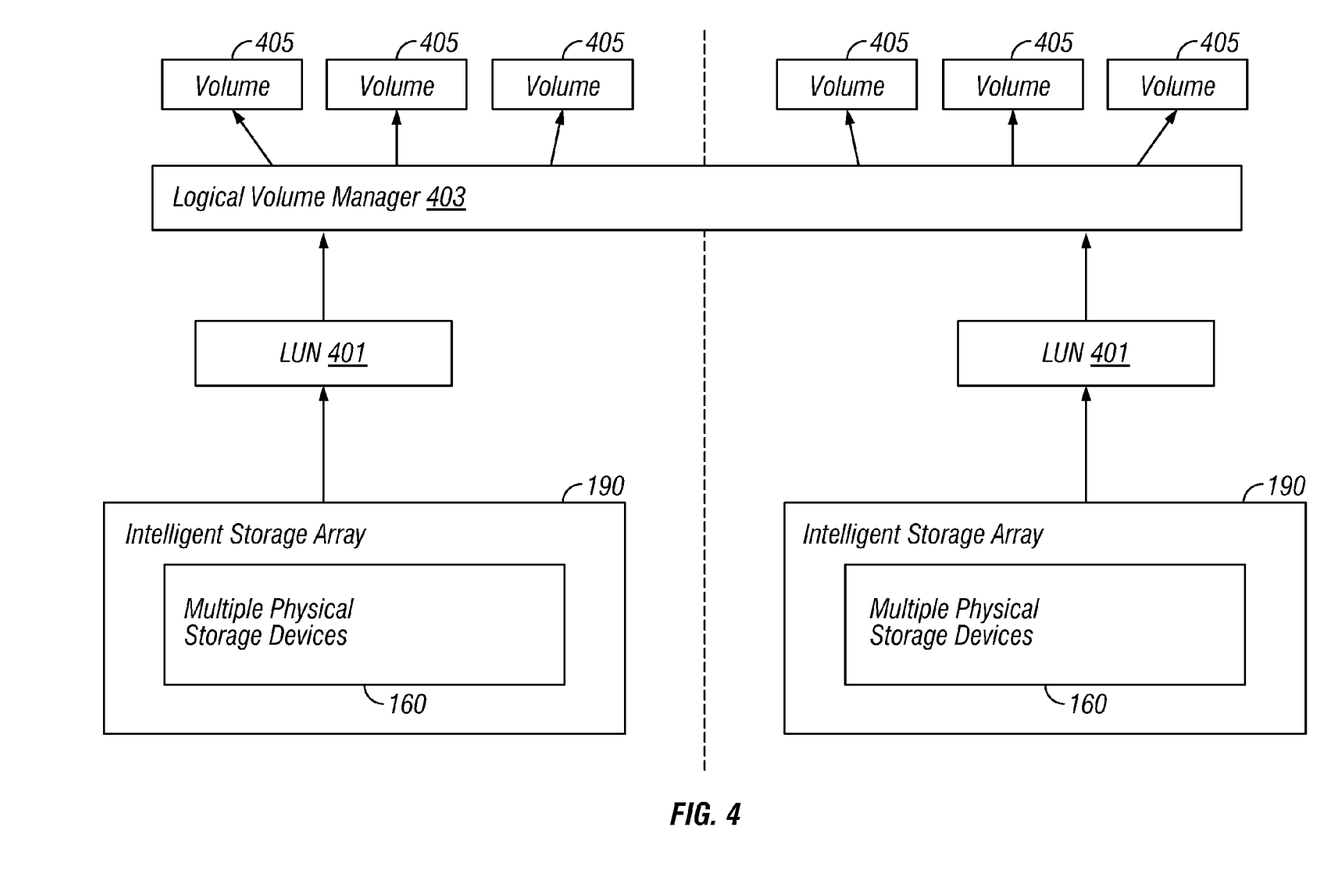
FIG. 4 is a block diagram of a shared storage architecture utilized by a quality of service manager, according to some embodiments.

Note that although the shared storage 309 utilized by the cluster is illustrated and described in conjunction with FIG. 3 as if it were a single storage device 160, in practice it is typically implemented with multiple underlying physical storage devices 160, which are managed by the clustering and storage system 301 so as to appear as a single storage device 160 to computer systems 210 accessing the shared storage 309. An example of the architecture of one such scenario according to one embodiment is illustrated in FIG. 4, which is discussed in more detail below. In some embodiments, the shared storage 309 is in the form of virtual storage provided by the virtualization environment 311, such as a set of one or more VMware disk(s) in the virtual machine disk (VMDK) format. An embodiment of this type is described in more detail below. In some embodiments, the cluster 300 is implemented using Veritas Storage Foundation High Availability (SFHA) or Veritas Storage Foundation Cluster File System High Availability (SFCFSHA), although other embodiments can be implemented in the context of other clustering and storage management environments, such as Microsoft Cluster Server.

As explained in greater detail below in conjunction with FIG. 5, the quality of service manager 101 optimizes the quality of service to prioritized VMs 305 and applications 313 by taking into account the varying quality of shared computing resources 315, such as CPU, memory, I/O bandwidth, I/O channels, storage, performance boosting cache, replication links, etc. As the term is used herein, a "shared computing resource" is any physical or logical resource that is shared among components on the computer system 210 in order to facilitate virtualization. The quality of service manager 101 evaluates the shared resources 315, and leverages distinctions in quality between resources 315 of the same type to provide quality of service to the VMs 305 based on their priority 507. In other words, multiple VMs 305 (or the applications 313 running thereon) running on a single host 210 and making requests for shared computing resources 315 to the hypervisor 307 thereon can have different priorities 507, based on, for example, the service level agreements entered into with different customers or internal clients being guaranteed varying levels of availability. Conventional hypervisors 307 fail to recognize that not all shared computing resources 315 of the same type behave in same way at all points in time. In fact, shared resources 315 of the same type (e.g., multiple I/O channels) can greatly vary in quality (e.g., availability, bandwidth, reliability, speed). The quality of service manager 101 makes optimum use of the shared resources 315 by providing the best available resources 315 to the VMs 305 and/or applications 313 with the highest priorities 507. In different embodiments, this functionality can be used to identify distinctions in quality among any type of shared computing resource 315, and provide varying qualities of service to specific VMs 305 (or applications 313) based on their priority 507.

FIG. 3 shows the quality of service manager 101 running at a hypervisor 307 level and providing quality of service that takes into account the varying quality of shared computing resources 315 assigned to VMs 305 by the hypervisor 307. It is to be understood that in other embodiments, the quality of service manager 101 runs at the level of a component other than a hypervisor 307 and assigns shared computing resources 315 to components other than VMs 305 in order to facilitate other forms of virtualization. For example, as described in detail below in conjunction with FIG. 6, in one embodiment the quality of service manager 101 runs at a multipathing component 601/HBA 235 level, and assigns shared resources 315 to applications 313 attempting to access a virtual multipathed disk 603. For purposes of this description, it can be helpful to recall that a VM 305 is a specialized type of application 313, and to think of VMs 305 this way.

FIG. 4 illustrates an example of a shared storage 309 architecture, according to some embodiments. Intelligent storage arrays 190 group multiple physical storage devices 160 into single logical units (LUNs) 401. Each LUN 401 appears as a single storage device 160 to an accessing host 210 or guest 305. The logical volume manager 403 of the clustering and storage system 301 can in turn provide software level logical volume management to create multiple logical volumes 405 on top of each LUN 401. Although FIG. 4 illustrates two LUNs 401 each of which is logically treated as three volumes 405, it is to be understood that clusters 300 can contain more or fewer LUNs 401, and that more or fewer logical volumes 405 can be built on top of a given LUN 401.

Figure 5:
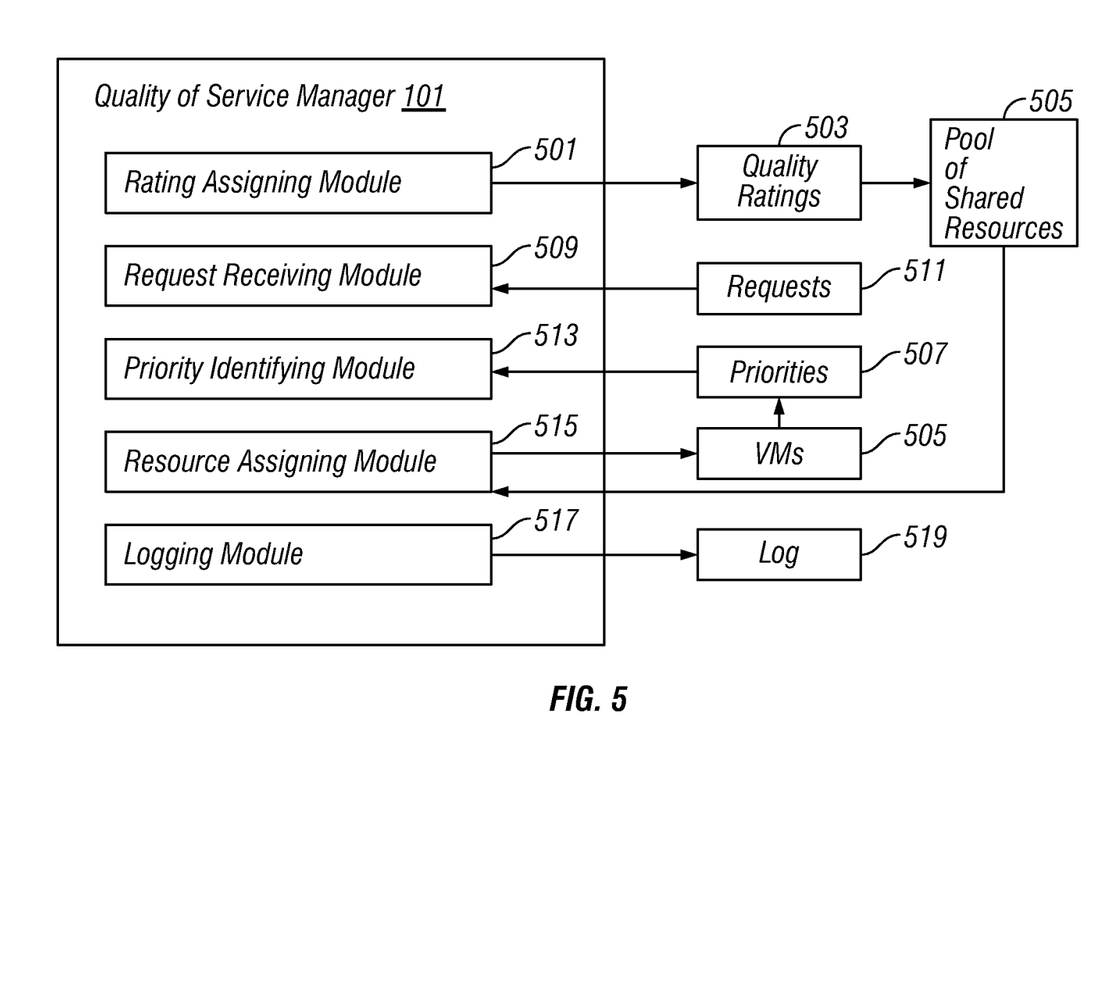
FIG. 5 is a block diagram of the modules of a quality of service manager, according to some embodiments.

Turning to FIG. 5, the modules of the quality of service manager 101 are illustrated in more detail according to one embodiment. A quality rating assigning module 501 of the quality of service manager 101 assigns quality ratings 503 to each shared resource 315 that can be utilized by a VM 305 on the host 210. The collection of such computing resources 315 can be thought of as a shared computing resource pool 505. The factors that affect the quality of a computing resource 315 can be static (e.g., the average access speed of a storage device or the maximum throughput of a network connection as determined by its underlying hardware configuration) or dynamic (e.g., the current amount of available space on a storage device or the current load on a communication channel). In different embodiments, the quality rating assigning module 501 can assign quality ratings 503 to computing resources 315 based on static factors, dynamic factors or a combination of the two. Because the quality of computing resources 315 can change dynamically, the quality rating assigning module 501 can continuously or periodically evaluate the resources 315 in the pool 505, and determine current quality ratings 503 based on their current status (e.g., based on real time changes to monitored capacities of the computing resources 315 that vary as a function of, e.g., level or type of usage). New computing resources 315 can be added to the pool 505, for example if a new network adapter is added to the computing device 210. When this occurs, the quality rating assigning module 501 detects the new computing resource 315 and assigns it an appropriate quality rating 503.

It is to be understood that the quality of shared computing resources can be a function of its programmatic configuration, instead of or in addition to the characteristics of any underlying hardware. For example, in one embodiment described in greater detail below in conjunction with FIG. 6, multiple priority queues 607 are maintained for each host bus adapter (HBA) 235. The I/Os in the higher priority queues 607 are sent to the HBA 235 at a higher frequency than those in lower priority queues 607, and thus the quality rating assigning module 501 assigns higher quality ratings 503 to the higher priority queues 607. However, the frequency with which each queue 607 is processed is a function of how it is managed programmatically, as opposed to any inherent characteristics of the HBA 235 or other underlying components.

As the term is used herein, a quality rating 503 is a quantification of the quality of a shared computing resource 315. Different internal formats can be used to represent quality ratings 503 in different embodiments (e.g., numbers on a scale, alphanumeric descriptors, percentages, etc.). In some embodiments, quality ratings 503 quantify different qualitative factors for different types of resources 315 (e.g., capacity for storage devices, bandwidth for I/O channels). In some embodiments, multiple qualitative factors are quantified for individual resources 315 by a single quality rating 503 (e.g., capacity, bandwidth and latency, represented by, for example, separate fields in a quality rating object). In other embodiments, a quality rating 503 is in the form of a single quantification of a resource's overall quality.

The different VMs 305 have different assigned priorities 507, which can be based on the corresponding service level agreements of the applications 313 running thereon, or on other factors that determine the VM's priority 507 relative to that of the other VMs 305 running on the same host 210. In one embodiment, the priorities 507 are assigned to the VMs 305, and applications 313 are run on VMs 305 with priorities 507 corresponding to the level of service to be provided to the specific application 313. In another embodiment, the priorities 507 are assigned to the applications 313 themselves, and each VM 305 takes its priority 507 from that of the application 313 that runs thereon. As described in greater detail below in conjunction with FIG. 6, in other embodiments priorities 507 can be assigned to each one of multiple applications 313 that run on one or more physical computer(s) 210, without consideration of VMs 305. Priorities 507 can be assigned to VMs 305 and/or applications 313 by administrators or other users (e.g., through a user interface) based on quality of service guaranties or other factors. For example, business critical applications can be run on a particular VM with a high priority 507. As the term is used herein, a priority 507 is an indicator of a quality of service to be provided to a VM 305 or application 313 relative to other VMs 305 or applications 313 on the same host or otherwise similarly situated. Different internal formats can be used to represent priorities 507 in different embodiments (e.g., low-medium-high, numbers on a scale, etc.). The priorities 507 are stored (e.g., by the clustering and storage system 301) in an accessible format (e.g., a global data structure, a database, etc.) such that the quality of service manager 101 can access them.

A request receiving module 509 of the quality of service manager 101 receives requests 511 made to the hypervisor 307 for computing resources 315. Recall that the quality of service manager 101 runs at the hypervisor 307 level. Therefore, the request receiving module 509 can receive the requests 511 of interest made to the hypervisor 307 by intercepting or otherwise filtering calls made to the hypervisor 307, and identifying those that request shared computing resources 315.

A priority identifying module 513 of the quality of service manager 101 identifies the priority 507 of the VM 305 (or application 313) that made the request 511 for the shared resource 315. In one embodiment, requests 511 for shared resources are tagged with an identifier of the originator (e.g., the ID of the VM 305 that made the request 511). In this case, the priority identifying module 513 identifies the originator of the request 511 from the tag, and retrieves the corresponding priority 507, e.g., from the global data structure. In other embodiments, the priority identifying module 513 identifies the originator of the request 511 (and hence is able to look up and retrieve its priority 507) in other ways. For example, where the request 511 is in the form of an attempt to access shared storage media 309, the priority identifying module 513 can identify the originator of the request 511 by determining the LUN 401 on which the attempted I/O operation is occurring.

In response to requests 511 for shared computing resources 315, a resource assigning module 515 of the quality of service manager 101 assigns specific shared resources 315 of the type requested from the pool 505, based on priority 507 of the requester (i.e., the VM 305 or application 313) and the quality rating 503 of the resource 315. In one embodiment, this process can comprise assigning the resources 315 with higher quality ratings 503 to service requests 511 made by components with higher priorities 507. In other embodiments, more specific levels of granularity are used to make the assignments. For example, priorities can indicate specific factors of importance such as reliability, speed, bandwidth, etc., and shared resources 315 having varying quality ratings 503 concerning these specific factors can be assigned to VMs 305 with corresponding factor-specific priorities 507. The exact levels of granularity to use for both quality ratings 503 and priorities 507, both generally and concerning specific factors, can vary between embodiments as desired. Likewise, the exact logic to use to assign resources 315 to requesters based on the mapping between quality ratings 503 and priorities 507 can vary between embodiments. By assigning shared computing resources 315 to VMs 305 and applications 313 based on the correspondence between quality ratings 503 and priorities 507, the quality of service manager 101 can provide quality of service to specific components in line with their associated specific priorities 507, as determined by service level agreement or otherwise. This makes more judicious use of the common pool 505 of shared resources 315.

In some embodiments, a logging module 517 of the quality of service manager 101 monitors the usage of shared computing resources 315 by specific VMs 305 (or applications 313) over time, and writes corresponding information to a log 519 for future reference. The logging module 517 can log information of varying levels of detail in different embodiments as desired. For example, the log 519 can document basic audit/statistical resource usage information, or the actual values utilized in accessing specific resources 315, such as the offsets of I/O sent to a given path, storage device, replication link etc., e.g., at the level of a file change log. The logged information can be used, for example, to compute incremental data updates (e.g., incremental data sent on a given pipe) and provide it to an off-host processing service (not illustrated), such as an incremental backup system or the like.

Figure 6:
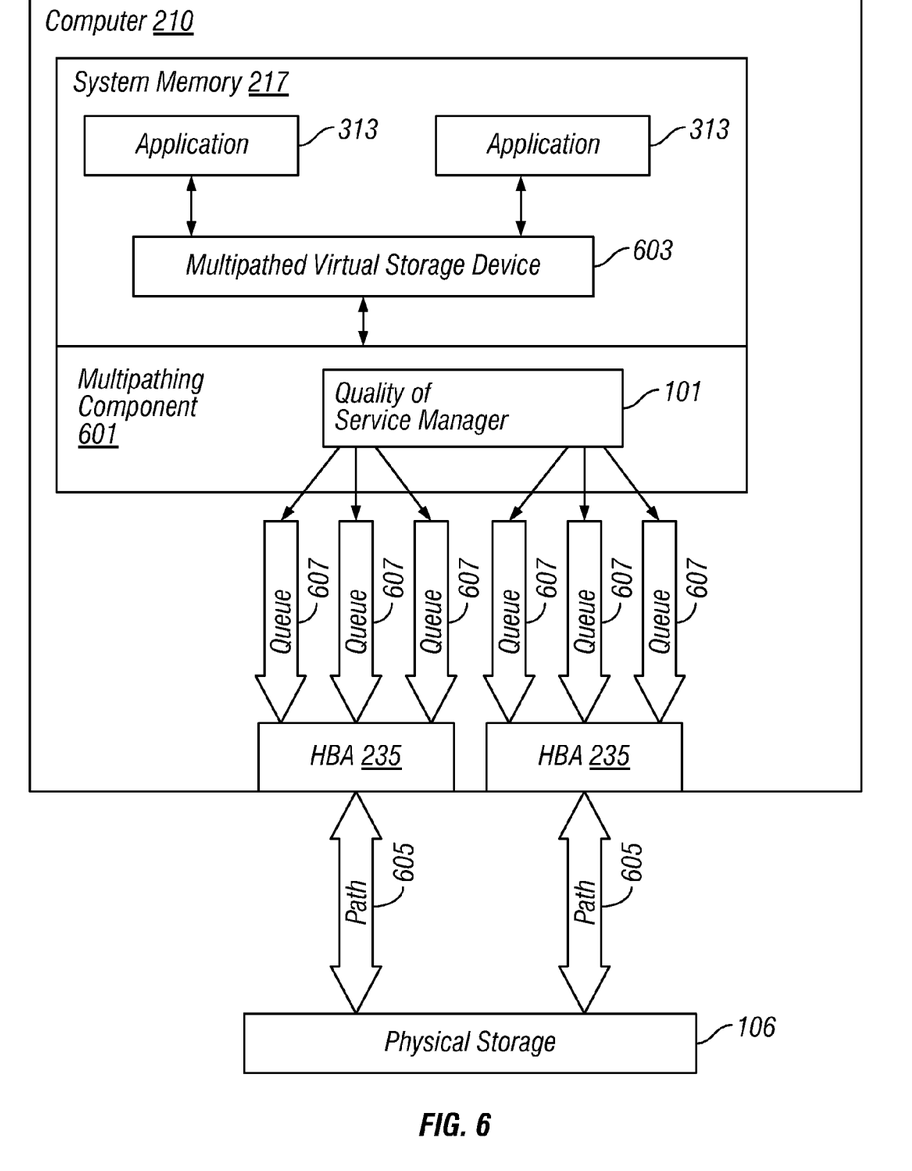
FIG. 6 is a block diagram illustrating a specific use case of the operation of a quality of service manager, according to some embodiments.

Drawing attention back to FIG. 3, a specific use case is now described to help illustrate the operation of the quality of service manager 101 according to one embodiment. As noted above, in one embodiment, the virtualization environment 311 is in the form of the VMware vSphere platform, and the hypervisor 307 is VMware's hardware level hypervisor ESX. In this embodiment, a plurality of VMs 305 run on top an instance of ESX 307 on a given host computer 210, and make requests 511 to ESX 307 to read and write data to and from a VMDK 309. (A VMDK 309 is a virtual machine disk in a VMware specific format.) The resource assigning module 515 assigns specific ones of these I/O operations to I/O queues 607 (which are a type of shared resource 315) of varying priority levels (i.e., varying quality ratings 503) based on the priority 507 of the VM 305 that requested the I/O operation. Note that I/O queues 607 are not specifically illustrated in FIG. 3, but FIG. 6 illustrates shared computing resources 315 in the form of queues 607 having different levels of priority. In the example of the specific use case being described, each VM 305 running on the host 210 has one of three priorities: high, medium or low. The resource assigning module 515 assigns one of the three I/O queues 607 to service I/O requests 511 from the VMs 305, by placing the I/O requests 511 into the assigned queue 607. The three queues 607 have quality ratings 503 of high, medium and low respectively. I/O requests 511 originating from VMs 305 with a priority 307 of high are placed in the high rated queue 607, those originating from medium priority VMs 305 in the medium rated queue 607 and those from low rated VMs 305 in the low rated queue 607. The queues 607 are serviced according to their rating, such that I/O requests 511 from high priority VMs 305 are processed with the highest quality of service and so on. It is to be understood that in similar use cases, more than three levels of quality rating 503 and priority 507 can be utilized.

In the use case being described, the priority identifying module 513 determines the VM 305 from which a given I/O request 511 originated (and hence its priority 507) by determining to or from which underlying LUN 401 the request 511 is directed. Recall that in this use case the shared storage 309 is in the form of a VMDK virtual disk. Thus, to determine the target LUN 401, the quality of service manager 101 creates a mapping 317 of the VMDK disk blocks affected by the I/O operation and the corresponding offsets in the set of LUNs 401 underlying the VMDK 309. This mapping 317 indicates the target LUN 401, and hence the originating VM 305 and its priority 507.

Different methodologies can be used to determine the VMDK disk 309 to LUN 401 mapping 317 in different implementations of this use case. For example, in one implementation VMware web-services APIs are used to determine the set of LUNs 401 which are part of a given VMware datastore. The storage mapping is determined using a given VMware command with a specific command line option (currently "vmkfstools -t0" although the command and calling parameter(s) could change in future versions of VMware products). This command outputs the mapping for VMDK blocks to offsets in a set of universally unique identifiers (UUIDs). Note that these UUIDs do not directly correlate to actual storage LUNs 401, but are stored in individual storage LUNs 401 beginning at a fixed offset (currently offset 00100080 in VMware Virtual Machine File System 4.1). By reading data at this offset on devices which are part of the given VMware datastore (as determined via the web-service APIs as described above), it is determined which LUNs 401 have which given UUIDs. Because the quality of service manager 101 has have the mapping for VMDK blocks to offsets in UUIDs as returned by the "vmkfstools -t0" command, and has determined which LUN 401 has which UUID, the quality of service manager 101 can now construct a mapping 317 of VMDK blocks to LUNs 401. Note that in other implementations, this mapping 317 is obtained other ways, for example by using certain VMware APIs where available. In any case, the mapping 317 indicates which blocks of VMDK data reside in which offset of a given LUN 401. Based on this mapping 317, a multipathing component (e.g., VxDMP in a VMware ESX environment) can determine which VM 305 a given I/O packet is coming from or going to, and hence which VM 305 made the request 511. Multipathing is discussed in more detail below in conjunction with FIG. 6. Once the VM 305 that made the request 511 is identified, the priority identifying module 513 identifies the priority 507 of that VM 305, and the resource assigning module 515 assigns the specific I/O operation to an I/O queue 607 with a matching quality rating 503.

Turning now to FIG. 6, another use case for the quality of service manager 101 is described. In the use case illustrated in FIG. 6, rather than run at a hypervisor 307 level, the quality of service manager 101 runs at the level of a multipathing component 601 of the clustering and storage system 301, with some modules running at HBA 235 level. More specifically, some storage management products such as Veritas Volume Manager's Dynamic Multipathing component support multipathed storage devices 603. A multipathed storage device 603 is a virtual disk which is made available to initiators of I/O, wherein multiple physical paths 605 exist between the virtual multipathed disk 603 and the underlying physical storage 160. Although FIG. 6 illustrates two paths 605 to physical storage 160, in practice more (or fewer) paths 605 can exist. Additionally, although FIG. 6 illustrates the physical storage 160 as a single component, typically the physical storage 160 would be implemented with multiple underlying physical storage devices 160, for example as illustrated in FIG. 4.

As illustrated in FIG. 6, multiple applications 313 run in the system memory 217 of a computer system 210, and initiate I/O operations targeting the virtual multipathed disk 603. In response, the multipathing component 601 determines which path 605 to use for given I/O operations. Conventionally, the multipathing component 601 employs a conventional load balancing policy (e.g., round robin, minimumq, etc.) to decide down which path 605 to send each I/O, and dynamically switches between paths 605 if a given path 605 fails. In order to send an I/O down a given path 605 to the physical storage 160, the multipathing component 601 sends the I/O to a specific host adapter bus (HBA) 235 configured to connect to the physical storage 160 via the given path 605.

In one use case illustrated in FIG. 6, the quality of service manager 101 maintains multiple priority queues 607 for each HBA 235. The multipathing component 601 receives I/Os targeting the virtual multipathed disk 603, and uses its load balancing policy to assign I/Os to specific HBAs 235. At the HBA 235 level, the resource assigning module 515 then assigns given I/Os to specific priority queues 607 for the specific HBA 235, based on the quality rating 503 of the queue 607 and the priority 507 of the application 313 which initiated the I/O operation. More specifically, FIG. 6 illustrates three priority queues 607 per HBA 235, one each for I/Os from high priority applications 313, medium priority applications 313 and low priority applications 313. In other embodiments, more, fewer or differently rated queues 607 can be maintained per HBA 235 as desired.

The priority identifying module 513 identifies the application 313 from which the I/O originated (for example, from a tag in the I/O request 511 or the LUN 401 on which the I/O operation is occurring), and hence identifies the application's priority 507. The resource assigning module 515 inserts the I/O in the appropriate priority queue 607, based on the priority 507 of the application 313. For example, in the illustrated three queue 607 embodiment, I/Os originating from applications 313 with a priority 507 of high are inserted in high priority queue 607, those from medium priority applications 313 in the medium priority queue 607 and those from the low priority applications 313 in the low priority queue 607.

The quality of service manager 101 sends I/Os down each HBA 235 from its priority queues 607 based on their respective priorities. In other words, the quality of service manager 101 selects the most I/Os from the high priority queue 607, fewer I/Os from the middle priority queue 607 and the least number of I/Os from low priority queue 607. The specific proportion of I/Os to select from each queue 607 can be determined based on relative priority, or can be set by an administrator or other user. The exact proportion to use is a variable design parameter, and different proportions can be used in different embodiments as desired. This servicing of I/O operations in proportion to the priority 507 of their originating applications 313 provides a higher level of service to higher priority applications 313.

In another embodiment of the use case illustrated in FIG. 6, quality ratings 503 are assigned to the specific paths 605 themselves, as opposed or in addition to the queues 607 to the paths 605. Conventionally, users can assign different weights to different paths 605 of a multipathed storage device 603. The weights are then used as a scheduling mechanism, such that each weight determines the proportion of I/Os being sent to the corresponding path 605. Weights can also be determined on the fly, based on factors such as the bandwidth of the path 605, the number of hops to the physical storage device 160, the stability of the path 605, etc.

In this embodiment, the quality rating assigning module 501 assigns quality ratings 503 to the paths 605 based on their weights (e.g., the higher the weight the higher the assigned quality rating 503). In some embodiments, rather than basing the quality ratings 503 of paths 605 on their assigned weights, the quality rating assigning module 501 actively determines a quality rating 503 for each path 605, by actively measuring factors such as its reliability, speed, availability, etc. To measure such factors, the quality rating assigning module 501 can statically or dynamically monitor factors such as number of hops, stability of the path 605, failures encountered in the past, storage controller upgrades, etc. In either case, the priority identifying module 513 then identifies the priorities 507 of applications 313 that send I/Os to the multipathed storage device 603, and the resource assigning module 515 sends each I/O down a path 605 with a corresponding quality rating 501. For example, I/Os originating from high priority applications are sent down the path 605 with the highest quality rating 503, etc. It is to be understood that in some embodiments, the assignment of quality ratings 503 to paths 605 and the assignment of quality ratings to queues 607 are utilized separately in order to provide quality of service to applications 313 based on their priority 507. In other embodiments, these features are used in combination. In these embodiments, each I/O is assigned to a specific path 605 with a specific quality rating 503 based on the priority 507 of the originating application 313, and then further assigned to specific priority queue 607 for that path 605, again based on the originating application's priority 507 (e.g., at a different level of granularity).

To apply the use case of FIG. 6 to a host running multiple VMs 305, priorities 507 can be assigned to VMs 305 as described above, and specific applications 313 can be run on a VM 305 with an appropriate priority 507.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer-implemented method comprising:
    dynamically assigning a quality rating to each one of a plurality of shared computing resources, wherein
        the quality rating quantifies a plurality of static and dynamic qualitative factors concerning the each one of the plurality of shared computing resources, and
        the each one of the plurality of shared computing resources is accessible by one or more applications executed by one or more virtual machines executed by a physical computer;
    receiving one or more requests for a shared computing resource from one or more requesting applications, wherein
        each of the one or more requesting applications is assigned a priority;
    identifying, for each of the one or more requests, the priority of the requesting application; and
    in response to the each of the one or more requests, assigning a shared computing resource to the requesting application, wherein
        the assigning is based on the priority of the requesting application and the quality rating of the shared computing resource.

2. The computer-implemented method of claim 1 wherein:
    the one or more applications executed by the one or more virtual machines executed by the physical computer further comprise a plurality of virtual machines executed by a single host.

3. The computer-implemented method of claim 1 wherein:
    the one or more applications executed by the one or more virtual machines further comprises an application executed by a specific virtual machine executed by a single host.

4. The computer-implemented method of claim 1 wherein:
    the each one of the plurality of shared computing resources further comprises a resource that is shared among the one or more applications executed by the one or more virtual machines executed by the physical computer.

5. The computer-implemented method of claim 1 further comprising:
    periodically evaluating the each one of the plurality of shared computing resources;
    determining a current quality rating for the each one of the plurality of shared computing resources, based on a current status of the each one of the plurality of shared computing resources; and
    assigning the current quality rating to the each one of the plurality of shared computing resources.

6. The computer-implemented method of claim 1 wherein:
    the quality rating quantifies a plurality of qualitative factors concerning a specific type of shared computing resource.

7. The computer-implemented method of claim 1 wherein:
    the quality rating quantifies a plurality of qualitative factors concerning the each one of the plurality of shared computing resources.

8. The computer-implemented method of claim 1 wherein:
    the quality rating further comprises a single quantification of an overall quality of the each one of the plurality of shared computing resources.

9. The computer-implemented method of claim 1 wherein:
    the priority of the one or more applications further comprises an indicator of a quality of service to be provided to the requesting application relative to other applications executed by the one or more virtual machines executed by the physical computer.

10. The computer-implemented method of claim 1 wherein the receiving one or more requests for a shared computing resource further comprises:
    the one or more requests for a shared computing resource being made by the one or more virtual machines to a hypervisor.

11. The computer-implemented method of claim 1 wherein the receiving one or more requests for a shared computing resource further comprises:
   receiving requests to access a virtual disk made by the one or more virtual machines.

12. The computer-implemented method of claim 1 wherein the identifying, for the each one of the plurality of requests, the priority of the requesting application further comprises:
   identifying the requesting application, from the one or more requesting applications, that made the request; and
   retrieving a current priority of the requesting application.

13. The computer-implemented method of claim 12 wherein the identifying the requesting application, from the one or more requesting applications, that made the request further comprises:
   identifying a logical unit identifier (LUN) of a storage unit targeted by an input/output (IO) operation, the IO operation comprising the request.

14. The computer-implemented method of claim 1 wherein:
   the receiving one or more requests for a shared computing resource further comprises receiving one or more requests to initiate input/output (IO) operations targeting a storage device;
   the plurality of shared computing resources further comprises a plurality of queues, wherein
      each queue of the plurality of queues is configured to access the storage device with a different level of priority; and
   the assigning a shared computing resource to the requesting application further comprises assigning one queue of the plurality of queues to the requesting application.

15. The computer-implemented method of claim 1 further comprising:
   logging information documenting usage of the plurality of shared computing resources by the one or more applications over time.

16. The computer-implemented method of claim 1 wherein the receiving one or more requests for a shared computing resource further comprises:
   receiving one or more requests to access a multipathed storage device from the one or more requesting applications.

17. The computer-implemented method of claim 16 wherein:
   the plurality of shared computing resources further comprises a plurality of queues, wherein
      each queue of the plurality of queues is configured to access one path of a plurality of paths to physical storage; and
   the dynamically assigning a quality rating to the each one of the plurality of shared computing resources further comprises assigning a level of priority to each queue of the plurality of queues.

18. The computer-implemented method of claim 16 wherein:
   the plurality of shared computing resources further comprises a plurality of paths to physical storage; and
   the dynamically assigning a quality rating to the each one of the plurality of shared computing resources further comprises
      assigning one or more quality ratings to each path of the plurality of paths, wherein
         the one or more quality ratings quantify the quality of the each path of the plurality of paths.

19. A non-transitory computer-readable storage medium storing program instructions executable to:
   dynamically assign a quality rating to each one of a plurality of shared computing resources, wherein
      the quality rating quantifies static and dynamic qualitative factors concerning the each one of the plurality of shared computing resources, and
      the each one of the plurality of shared computing resources is accessible by one or more applications executed by one or more virtual machines executed by a physical computer;
   receive one or more requests for a shared computing resource from one or more requesting applications, wherein
      each of the one or more requesting applications is assigned a priority;
   identify, for each of the one or more requests, the priority of the requesting application; and
   in response to the each of the one or more requests, assign a shared computing resource to the requesting application, wherein
      assigning is based on the priority of the requesting application and the quality rating of the shared computing resource.

20. A computer system comprising:
   one or more processors; and
   a memory coupled to the one or more processors, wherein
      the memory stores program instructions executable by the one or more processors to:
   dynamically assign a quality rating to each one of a plurality of shared computing resources, wherein
      the quality rating quantifies static and dynamic qualitative factors concerning the each one of the plurality of shared computing resources, and
      the each one of the plurality of shared computing resources is accessible by one or more applications running on executed by one or more virtual machines executed by the computer system;
   receive one or more requests for a shared computing resource from one or more requesting applications, wherein
      each of the one or more requesting applications is assigned a priority;
   identify, for each of the one or more requests, the priority of the requesting application; and
   assign, in response to the each of the one or more requests, a shared computing resource to the requesting application, wherein
      assigning is based on the priority of the requesting application and the quality rating of the shared computing resource.

21. The computer-implemented method of claim 1 wherein:
   the receiving the one or more requests for a shared computing resource further comprises
      receiving one or more requests to initiate input/output (IO) operations targeting a multipathed storage device; and
   the plurality of shared computing resources further comprises a plurality of paths to a physical storage device.

* * * * *